United States Patent [19]

Vassiliadis et al.

[11] Patent Number: 5,301,341
[45] Date of Patent: Apr. 5, 1994

[54] OVERFLOW DETERMINATION FOR THREE-OPERAND ALUS IN A SCALABLE COMPOUND INSTRUCTION SET MACHINE WHICH COMPOUNDS TWO ARITHMETIC INSTRUCTIONS

[75] Inventors: Stamatis Vassiliadis, Vestal; James E. Phillips, Binghamton, both of N.Y.

[73] Assignee: International Business Machines Corporation, Armonk, N.Y.

[21] Appl. No.: 619,868

[22] Filed: Nov. 28, 1990

[51] Int. Cl.$^5$ .................................. G06F 7/50
[52] U.S. Cl. .......................... 395/800; 364/258; 364/258.1; 364/259.1; 364/254; 364/DIG. 1; 364/786
[58] Field of Search ............... 364/784, 786, 787, 736; 395/800

[56] References Cited

U.S. PATENT DOCUMENTS

| | | | |
|---|---|---|---|
| 4,142,242 | 2/1979 | Duvochel | 364/759 |
| 4,439,828 | 3/1984 | Martin | 364/200 |
| 4,467,444 | 8/1984 | Harmon | 395/575 |
| 4,547,863 | 10/1985 | Colardelle | 364/784 |
| 4,748,585 | 5/1988 | Chiarulk | 395/775 |
| 4,783,757 | 11/1988 | Krauskopf | 364/784 |
| 4,839,851 | 6/1989 | Maki | 395/800 |
| 4,845,655 | 7/1989 | Yamada | 364/786 |
| 4,920,509 | 4/1990 | Hmida | 364/786 |

OTHER PUBLICATIONS

Digital Logic and Computer Design by M. Morris Mano, Prentice Hall 1979 pp. 327, 328, 382-384.

Acosta, R. D., et al, "An Instruction Issuing Approach to Enhancing Performance in Multiple Functional Unit Processors", IEEE Transactions on Computers, Fall, C-35, No. 9, Sep. 1986, pp. 815-828.

Anderson, V. W., et al, the IBM System/360 Model 91: "Machine Philosophy and Instruction Handling", computer structures: Principles and Examples (Siewiorek, et al, ed (McGraw-Hill, 1982, pp. 276-292.

Capozzi, A. J., et al, "Non-Sequential High-Performance Processing" IBM Technical Disclosure Bulletin, vol. 27, No. 5, Oct. 1984, pp. 2842-2844.

Chan, S., et al, "Building Paralelism into the Instruction Pipeline", High Performance Systems, Dec., 1989, pp. 53-60.

Murakami, K., et al., "SIMP (Singel Instruction Stream/Multiple Instruction Pipelining); A Novel High-Speed Single Processor Architecture", Proceedings of the Sixteenth Annual Symposium on Computer Architecture, 1989, pp. 78-85.

Smith, J. E., "Dynamic Instructions Scheduling and the Astronautics ZS-1", IEEE Computer, Jul., 1989, pp. 21-35.

Smith, M. D., et al, "Limits on Multiple Instruction Issue", ASPLOS III, 1989, pp,. 290-302.

Tomasulo, R. M., "An Efficient Algorithm for Exploiting Multiple Arithmetic Units", Computer Structures, Principles, and Examples (Siewiorek, et al ed), McGraw-Hill, 1982, pp. 293-302.

Wulf, P. S., "The WM Computer Architecture", Computer Architecture News, vol. 16, No. 1, Mar. 1988, pp. 70-84.

Jouppi, N. P., et al, "Available Instruction-Level Parallelism for Superscalar Pipelined Machines", ASPLOS III, 1989, pp. 272-282.

Jouppi, N. P., "The Non-Uniform Distribution of Instruction-Level and Machine Paralelism and its Effect on Performance", IEEE Transactions on Computers, vol. 38, No. 12, Dec., 1989, pp. 1645-1658.

Ryan, D. E., "Entails 80960: An Arhitecture Optimized for Embedded Control", IEEE Microcomputers, vol. 8, No. 3, Jun., 1988, pp. 63-76.

(List continued on next page.)

*Primary Examiner*—Eric Coleman
*Attorney, Agent, or Firm*—Baker, Maxham, Jester & Meador

[57] ABSTRACT

A mechanism is presented for detecting overflow in an interlock collapsing hardware apparatus that simultaneously executes two instructions. The overflow is determined as if the second instruction executes by itself using results from execution of the first instruction. Overflow detection is accomplished by using only values input into, and generated within, the interlock collapsing apparatus.

3 Claims, 6 Drawing Sheets

OTHER PUBLICATIONS

Colwell, R. P., et al, "A VLIW Architecture for a Trace Scheduling Compiler", IEEE Transactions on Computers, vol. 37, No. 8, Aug., 1988, pp. 967–979.

Fisher, J. A., "The VLIW Machine: A Multi-Processor for Compiling Scientific Code", IEEE Computer, Jul., 1984, pp. 45–53.

Berenbaum, A. D., "Introduction to the CRISP Instruction Set Architecture", Proceedings of Compcon, Spring, 1987, pp. 86–89.

Bandyopadhyay, S., et al, "Compiling for the CRISP Microprocessor", Proceedings of Compcon, Spring, 1987, pp. 96–100.

Hennessy, J, et al, "MIPS: A VSI Processor Architecture", Proceedings of the CMU Conference on VLSI Systems and Computations, 1981, pp. 337–346.

Patterson, E. A., "Reduced Instruction Set Computers", Communications of the ACM, vol. 28, No. 1, Jan., 1985, pp. 8–21.

Radin, G., "The 801 Mini-Computer", IBM Journal of Research and Development, vol. 27, No. 3, May, 1983, pp. 237–246.

Ditzel, D. R., et al, "Branch Folding in the CRISP Microprocessor: Reducing Branch Delay to Zero", Proceedings of Compcon, Spring 1987, pp. 2–9.

Hwu, W. W., et al, "Checkpoint Repair for High-Performance Out-of-Order Execution Machines", IEEE Transactions on Computers vol. C36, No. 12, Dec., 1987, pp. 1496–1594.

Lee, J. K. F., et al, "Branch Prediction Strategies in Branch Target Buffer Design", IEEE Computer, vol. 17, No. 1, Jan. 1984, pp. 6–22.

Riseman, E. M., "The Inhibition of Potential Parallelism by Conditional Jumps", IEEE Transactions on Computers, Dec., 1972, pp. 1405–1411.

Smith, J. E., "A Study of Branch Prediction Strategies", IEEE Proceedings of the Eight Annual Symposium on Computer Architecture, May 1981, pp. 135–148.

Archibold, James, et al, Cache Coherence Protocols: "Evaluation Using a Multiprocessor Simulation Model", ACM Transactions on Computer Systems, vol. 4, No. 4, Nov. 1986, pp. 273–398.

Baer, J. L., et al "Multi-Level Cache Hierarchies: Organization, Protocols, and Performance" Journal of Parallel and Distributed Computing, vol. 6, 1989, pp. 451–476.

Smith, A. J., "Cache Memories", Computing Surveys, vol. 14, No. 3 Sep., 1982, pp. 473–530.

Smith, J. E., et al, "A Study of Instruction Cache Organizations and Replacement Policies", IEEE Proceedings of the Tenth Annual International Symposium on Computer Architecture, Jun., 1983, pp. 132–137.

Vassiliadids, S., et al, "Condition Code Predictory for Fixed-Arithmetic Units", International Journal of Electronics, vol. 66, No. 6, 1989, pp. 887–890.

Tucker, S. G., "The IBM 3090 System: An Overview", IBM Systems Journal, vol. 25, No. 1, 1986, pp. 4–19.

IBM Publication No. SA22-7200-0, Principles of Operation, IBM Enterprise Systems Architecture/370, 1988.

The Architecture of Pipelined Computers, by Peter M. Kogge Hemisphere Publishing Corporation, 1981.

IBM Technical Disclosure Bulletin (vol. 33 No. 10A, Mar. 1991), by R. J. Eberhard.

OVERFLOW DETERMINATION FOR THREE-OPERAND ALUS IN A SCALABLE COMPOUND INSTRUCTION SET MACHINE WHICH COMPOUNDS TWO ARITHMETIC INSTRUCTIONS

CROSS REFERENCE TO RELATED APPLICATION

The present United States patent application is related to the following co-pending United States patent applications:

Application Ser. No. 07/519,382, filed May 4, 1990, entitled "SCALABLE COMPOUND INSTRUCTION SET MACHINE ARCHITECTURE", the inventors being Stamatis Vassiliadis et al. now abandoned;

Application Ser. No. 07/519,384, filed May 4, 1990, entitled "GENERAL PURPOSE COMPOUND APPARATUS FOR INSTRUCTION-LEVEL PARALLEL PROCESSORS", the inventors being Richard J. Eickemeyer et al. now abandoned;

Application Ser. No. 07/504,910, filed Apr. 4, 1990, entitled "DATA DEPENDENCY COLLAPSING HARDWARE APPARATUS", the inventors being Stamatis Vassiliadis et al. now U.S. Pat. No. 5,051,940;

Application Ser. No. 07/522,291, filed May 10, 1990, entitled "COMPOUNDING PREPROCESSOR FOR CACHE", the inventors being Bartholomew Blaner et al. now U.S. Pat. No. 5,214,765;

Application Ser. No. 07/543,464, filed Jun. 26, 1990, entitled "AN IN-MEMORY PREPROCESSOR FOR A SCALABLE COMPOUND INSTRUCTION SET MACHINE PROCESSOR", the inventors being Richard J. Eickemeyer et al.; and Application Ser. No. 07/543,458, filed Jun. 26, 1990, entitled "MEMORY MANAGEMENT FOR SCALABLE COMPOUND INSTRUCTION SET MACHINES WITH IN-MEMORY COMPOUNDING", the inventors being Richard J. Eickemeyer et al. now U.S. Pat. No. 5,197,135.

These co-pending applications and the present application are owned by the same Assignee, namely, INTERNATIONAL BUSINESS MACHINES CORPORATION of Armonk, N.Y.

The descriptions set forth in these co-pending applications are hereby incorporated into this application by reference.

BACKGROUND OF THE INVENTION

This invention relates to digital computers and digital data processors, and particularly to digital computers and data processors capable of executing two or more instructions simultaneously.

Traditional computers which receive a sequence of instructions and execute the sequence one instruction at a time are known. The instructions executed by these computers operate on single-valued objects, hence the name "scalar" for these computers.

The operational speed of traditional scalar computers has been pushed to its limits by advances in circuit technology, computer mechanisms, and computer architecture. However, with each new generation of competing machines, new acceleration mechanisms must be discovered for traditional scalar machines.

A recent mechanism for accelerating the computational speed of uniprocessors is found in reduced instruction set architecture that employs a limited set of very simple instructions. Another acceleration mechanism is complex instruction set architecture which is based on a minimal set of complex multi-operand instructions. Application of either of these approaches to an existing scalar computer would require fundamental alteration of the instruction set and architecture of the machine. Such a far-reaching transformation is fraught with expense, down-time, and initial reduction in the machine's reliability and availability.

In the co-pending patent applications, a scalable compound instruction set machine (SCISM) architecture is described in which instruction level parallelism is achieved by statically analyzing a sequence of scalar instructions one at a time prior to instruction execution in order to generate compound instructions formed by adjacent grouping of existing instructions in the sequence which are capable of parallel execution. Relatedly, when used herein, the term "compounding" refers to the grouping of instructions contained in a sequence of instructions, the grouping being for the purpose of concurrent or parallel execution of the grouped instructions. At a minimum, compounding is satisfied by "pairing" of two instructions for simultaneous instruction. Preferably, compounded instructions are unaltered from the forms they have when presented for scalar execution.

Parallel or simultaneous execution of scalar instructions poses certain hazards which must be accommodated in a SCISM machine. Such hazards are also called "interlocks". More particularly, a data dependency hazard, also called a "write-read hazard" or "write-read interlock" exists when two instructions of a serial sequence of instructions are executed simultaneously or in parallel. In this regard, the hazard arises when the second instruction must read the result of the first instruction in order to execute. See, for example, FIG. 1 where a first instruction 10 precedes a second instruction 12 in an instruction sequence. Both instructions require access to a set of general purpose registers (GPR) 14 where operands for instruction execution are stored. The first instruction 10 requires two operands which are stored in register locations 15 and 16, respectively. Assume that instruction execution requires that the result be written back into the GPR at register location 16. The second instruction 12 also requires two operands for execution, the operands stored at register locations 17 and 16. In order for the second instruction 12 to produce reliable results, its execution must be delayed until the results of executing the first instruction 10 have been written to register location 16.

A mechanism, illustrated in FIG. 2, has been proposed for collapsing the data dependency illustrated in FIG. 1. FIG. 2 shows that two instructions, for example, instructions 10 and 12 in FIG. 1, may be compounded into a unit that is to be considered as a single execution unit. If the first and second instruction 10 and 12 were compounded, the compounding would result in their being issued and executed in parallel. In the structure of FIG. 2, the compounded instructions are executed simultaneously, with the first instruction being executed by a two-to-one ALU 19, and the second instruction by a three-to-one ALU 21. The ALU 21 is designed to collapse write-read interlocks that might occur between the two instructions. In the example of FIG. 1, the ALUs 19 and 21 execute the instructions 10 and 12 in parallel with the ALU 19 operating on the operands in register locations 15 and 16, and the ALU 21 operating on the operands in register locations 15, 16, and 17. The operation of the ALU 21 implicitly combines the operands in register locations 15 and 16 as required by the first instruction to obtain a result necessary for execution of the second instruction.

Since the ALU 21 is designed to collapse write-read interlocks that might occur between two instructions being executed in parallel, the ALU is designed to execute the functions that arise for all instruction sequences whose interlocks must be collapsed. The operation of the ALU 21 is not the subject of this patent application, but is explained in detail in co-pending U.S. patent application 07/504,910.

The interlock collapsing hardware of FIG. 2 computes correct results for a compounded instruction when the individual instructions both specify valid ALU operations and contain a write-read hazard. However, such an apparatus will produce erroneous results when two invalid operations are specified. This constitutes a major difficulty which must be resolved in order to achieve compliance between the SCISM architecture and the architecture of the scalar machine which executes instructions sequentially.

The ALU 19 generates results for the execution of a first instruction, performing this execution as a "normal" two-to-one ALU operation. The determination of condition codes, CCs, and detection of overflow, OF, from the operation can be obtained using existing techniques.

Since the ALU 19 will set CCs and OFs resulting from the execution of the first instruction, the ALU 21 should limit its determination of these conditions only as if executing the second instruction by itself. In particular, the detection of overflow, OF, in the ALU 21 should be performed in parallel with a computation of its result and made as if the result of the ALU 19 was available and only the second instruction was being executed. To make this possible, certain information relating to the execution of the second instruction alone must be ascertained during the execution of this instruction by the ALU 21.

Therefore, there is a significant need for OF detection in a data dependency collapsing hardware apparatus such as in an apparatus which executes a pair of compounded instructions simultaneously. The detection of overflow must be specific to the execution of only the second instruction, yet must be gleaned from the execution of the three-to-one operation in the dependency collapsing hardware apparatus.

SUMMARY OF THE INVENTION

It is, therefore, the primary objective of this application to provide an implementation for overflow detection in a data dependency collapsing hardware apparatus which simultaneously executes a pair of scalar instructions.

A related objective is that the indication of overflow detection in such an apparatus be specific to execution of only the second of the simultaneously executed instructions.

A particular advantage of the invention is that such overflow detection is accomplished by using only values input into, and generated within, the data dependency collapsing apparatus.

The invention is expressed as a mechanism for detecting arithmetic overflow in an apparatus for simultaneously executing two instructions. The mechanism includes a carry-save adder which generates sum and carry signals in response to three multi-bit, binary operands. A carry lookahead adder is connected to the carry-save adder for generating a result signal in response to the sum and carry signals, the result signal representing a result achieved by execution of the series of two binary arithmetic operations performed on the three multi-bit, binary operands. The mechanism includes a logic circuit connected to the carry-save adder for producing an overflow signal, OF, representing an overflow condition resulting from the execution of the second of the binary arithmetic operations, the overflow signal produced in response to the operands and the sum and carry signals.

That this mechanism satisfies the above-stated objectives and advantages will be appreciated when the following detailed description is read with reference to the below-described drawings.

DETAILED DESCRIPTION OF THE PREFERRED EMBODIMENT AND BEST MODE OF OPERATION

Figure 1:
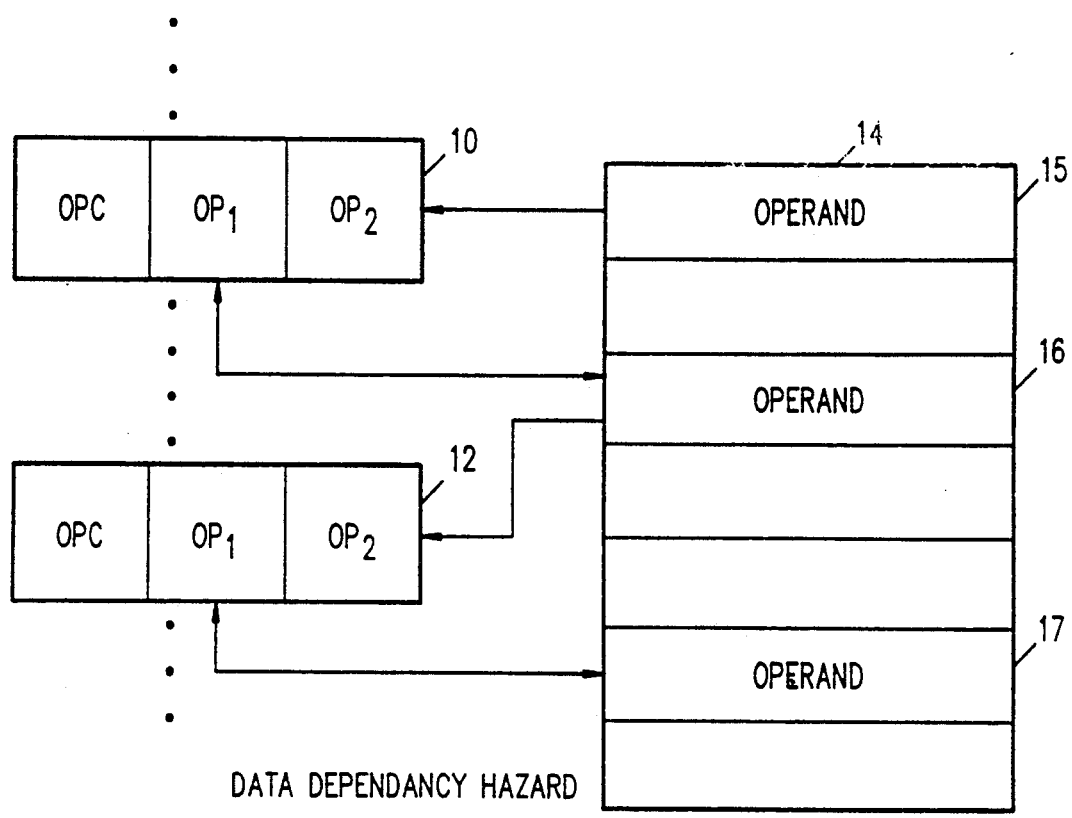
FIG. 1 is a diagram illustrating data dependency between two instructions.
Figure 2:
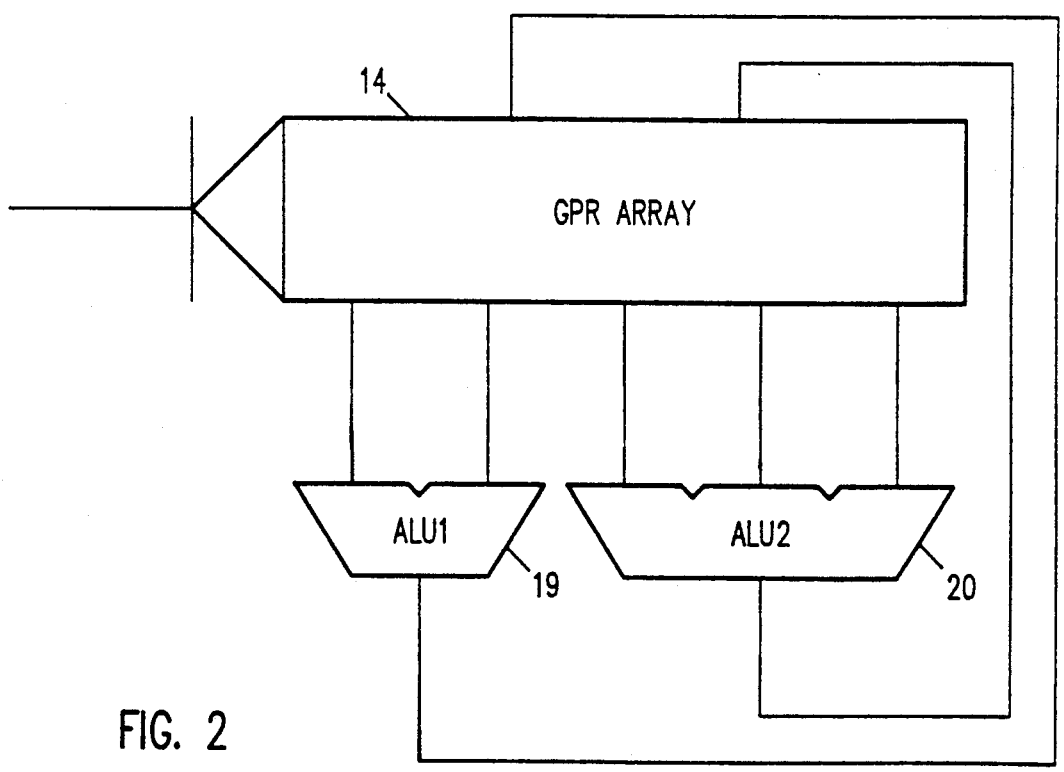
FIG. 2 is a block diagram illustrating a data dependency collapsing hardware apparatus for simultaneous execution of two scalar instructions.

A data dependency collapsing hardware apparatus (hereinafter a "3-1 ALU") is illustrated by the circuit diagram of FIG. 3 in which a carry-save adder (CSA) 30 is connected in series with a carry look-ahead adder (CLA) 32. This configuration implements the arithmetic portion of the ALU 21 of FIG. 2 and supports the simultaneous execution of a pair of compounded instructions with a data dependency hazard. The concept of compounded interlock instruction execution can be clarified using add and subtract instructions, ADD and SUB, respectively. These two instructions are classed as a unique instruction type (i.e., an "ADD" type) because they utilize the same hardware for execution. Consequently, they can be combined and executed as one instruction. Consider the following sequence:

ADD $R_1,R_2$ add $R_1$ to $R_2$ and put result in $R_1$

SUB $R_1,R_3$ subtract $R_3$ from $R_1$ and put result in $R_1$ wherein the ADD instruction is executed by adding the contents of register $R_1$ to the contents of register $R_2$ and placing the contents back into register $R_1$ and the SUB instruction is executed by subtracting the contents of register $R_3$ from the contents of register $R_1$ and placing the result back into register $R_1$. Representation of sequential execution of the arithmetic operations is given by:

$$R1 = R1 + R2$$

$$R1 = R1 - R3$$

To exploit parallelism, simultaneous execution of the two instructions requires execution of:

$$R1 = R1 + R2 - R3$$

in the amount of time required to execute a single instruction.

Figure 3:
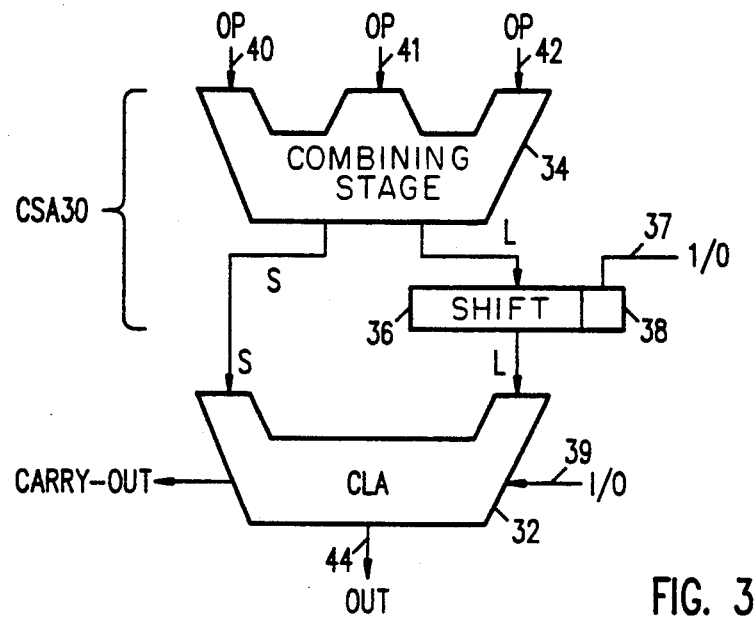
FIG. 3 is a schematic diagram illustrating a data dependency collapsing ALU including a carry-save and a carry-look ahead adder.

Execution of ADD type instructions and elimination of interlock in the data dependency collapsing apparatus of FIG. 3 are accomplished by the serial connection of the CSA 30 with the CLA 32. For the example given above, the inputs to the CSA 30 are the operands contained in the three registers R1, R2, and R3 with the contents of register R3 complemented. As is conventional, the CSA produces two outputs in response to the three inputs, the outputs denoted as a sum output (S) and carry output (L). These two outputs are provided as operands to the CLA 32 which combines them to produce a single result denoted as OUT.

In FIG. 3, the CSA 30 includes a combining stage 34 which receives the three operands on 40, 41, and 42. A carry-save shift circuit 36 is provided which receives the carry output. The carry output is shifted at 36 in order to append a "one" or "zero" (a "hot" one or zero) on the carry value by way of input 37. This value is also referred to as a "carry-in". The value on the input 37 is set conventionally according to the function to be performed by the CSA 30.

The sum and carry (with appended one or zero) outputs of the CSA 30 are provided as the two inputs to the CLA 32. The CLA 32 also conventionally receives a "hot" one or zero on input 39 according to the desired operation and produces the result (OUT) at 44. The result produced by the CLA 32 represents the result produced by the sequential execution of two arithmetic instructions, with the sequence being collapsed into a single operation by the apparatus of FIG. 3.

Carry-save and carry look-ahead adders are conventional components whose structures and functions are well-known. Hwang, in his COMPUTER ARITHMETIC: PRINCIPLES, ARCHITECTURE, AND DESIGN, 1979, describes carry-look ahead adders at length at pages 88–93 and carry-save adders at pages 97–100.

The information that must be derived from the 3-1 ALU of FIG. 3 in order to properly determine status resulting from execution of the second instruction alone can be divided into two categories. First, the carries into and out of the sign bit resulting only from the execution of the second instruction of a compounded instruction pair need to be determined. Second, the sign bit of the result from the first instruction needs to be determined in order to derive the conditions resulting from arithmetic, two's-complement operation.

In order to properly detect overflow, the carries into and out of the sign bit that would occur if the second instruction of a compound instruction were executed as a two-to-one operation after the result of the first operation need to be determined. These carries can be determined from the carries generated by the three-to-one addition performed by the apparatus illustrated in FIG. 3.

The functions that are encompassed within the three-to-one addition arise from combinations of add-class instructions that interlock at the first or second operand of the second instruction. These functions are listed in Tables I and II, where instructions drawn from the instruction set for the System/370 computer system available from the Assignee are assumed. In the 370 instruction format, for add-type instructions, the second operand is added to or subtracted from the first operand, with the results stored at the first operand location. Table I lists the functions that arise when the instructions are interlocked on the first operand of the second instruction, while Table II lists the functions that arise when the instructions interlock on the second operand of the second instruction. In these tables, a and d represent the first and second operands, respectively, of the first instruction, while a and b represent the two operands for the second instruction. Operands are represented as 32 bit two's complement numbers with the most significant bit position designated as bit position zero. For example, operand a is represented as:

$$a = [a_0, a_1, \ldots, a_{31}]$$

where $a_0$ denotes the most significant bit, the "sign" bit, and $a_{31}$ denotes the least significant bit.

In Tables I and II, eight possible cases arise when two add-class instructions are simultaneously executed by an arithmetic unit such as that illustrated in FIG. 3. For example, the second line of Table I represents the example given above for an ADD followed by a SUB. Of the eight possible cases listed in the tables, only six cases are unique, since the two interlock types produce identical results when the second instruction is an addition. These six cases as identified in the tables are used in the appendix to illustrate derivation of arithmetic unit functions in the discussion which follows. In addition, the cases illustrated in Tables I and II determine how "hot" ones must be set up to properly execute the operation. The required setup of "hot" ones is also included in those tables. The quantities $t_0$ and $t_1$ correspond to the "hot" one requirements when collapsing interlocks with $t_1 = 1$ when computation of either $-a$ or $-b$ is required, while $t_0 = 1$ when computation of $-d$ is required. The quantities $h_0$ and $h_1$ correspond to the "hot" ones that must be supplied to the first and second instructions, respectively, of an instruction pair when executed serially.

Three-to-one additions are performed with a combination of CSA and CLA as illustrated in FIG. 3. The CSA generates a sum and carry from the three input operands, while the CLA produces a single result by adding the sum from the CSA to the carry from the CSA, shifted one bit position toward the MSB by appending a "hot" one or zero. Assuming no overflow, and proper addition with truncations the CSA operation can be represented as:

$$\begin{array}{c} a^*_0 a^*_1 \ldots a^*_{30} a^*_{31} \\ b^*_0 b^*_1 \ldots b^*_{30} a^*_{31} \\ \underline{d^*_0 d^*_1 \ldots d^*_{30} d^*_{31}} \\ s_0 s_1 \ldots s_{30} s_{31} \\ l_1 l_2 \ldots l_{31} \end{array}$$

where $s_i$, $0 \leq i \leq 31$, represents the CSA sum and $l_i$, $0 \leq i \leq 31$, represents the CSA carry. Similarly, the CLA operation can be represented as:

$$\begin{array}{r} f_1 \ldots f_{30} f_{31} t_1 \\ s_0 s_1 \ldots s_{30} s_{31} \\ \underline{l_1 \ldots l_{31} t_0} \\ S_0 S_1 \ldots S_{30} S_{31} \end{array}$$

in which $f_i$, $0 \leq i \leq 31$, denotes the possible carries generated or propagated in the CLA and $t_0$ and $t_1$ represent the "hot" ones applied to the arithmetic unit to perform subtraction as previously discussed. In these examples, the operands in the ALU are still represented as a, b, and d, however, the * has been added to indicate that the true or the one's complement of the operand is provided as input to the ALU as required to accomplish the desired addition or subtraction of corresponding operands.

In the absence of overflow, execution of the instruction pair by the ALU of FIG. 3 as a three-to-one operation must produce results which are equivalent to serial execution of the instruction pair when proper truncation is applied. The serial execution can be represented as two two-to-one additions, wherein the first instruction execution is as follows:

$$\begin{array}{r} k_1 \ldots k_{30} \, k_{31} \, h_0 \\ a_0 \, a_1 \ldots a_{30} \, a_{31} \\ \underline{d^*_0 \, d^*_1 \ldots d^*_{30} \, d^*_{31}} \\ e_0 \, e_1 \ldots e_{30} \, e_{31} \end{array}$$

and the second instruction execution is as follows:

$$\begin{array}{r} c_1 \ldots c_{30} \, c_{31} \, h_1 \\ e^*_0 e^*_1 \ldots e^*_{30} e^*_{31} \\ \underline{b^*_0 b^*_1 \ldots b^*_{30} b^*_{31}} \\ S^*_0 S^*_1 \ldots S^*_{30} S^*_{31} \end{array}$$

where k represents the carries generated during the execution of the first instruction, c represents the carries generated by execution of the second instruction, and $h_0$ and $h_1$ represent the "hot" ones provided to the two-to-one adder for execution of the first and second instructions, respectively. In these expressions, the * represents either the true or the one's complements of the operands supplied, depending upon whether the operand is to be added or subtracted.

Refer now to Appendix I for an understanding of the basis for generating the overflow status of the 3-1 ALU during a three-to-one addition operation as if the second instruction were executed serially.

In a two-to-one adder, overflow is detected by exclusive-ORing the carries into and out of the sign bit resulting from the two-to-one addition. The invention allows the implicit determination of the carries into, $c_1$, and the carries out of, $c_0$, the sign bit that would occur from the sole execution of the second of a compounded pair of instructions even though the ALU of FIG. 3 is performing three-to-one addition that collapses write-read interlocks. As a result, the detection of overflow from the execution of the second instruction can be determined by equation (1), in which "V" denotes the exclusive-or operation:

$$OF = c_0 V c_1 \qquad (1)$$

Figure 4:
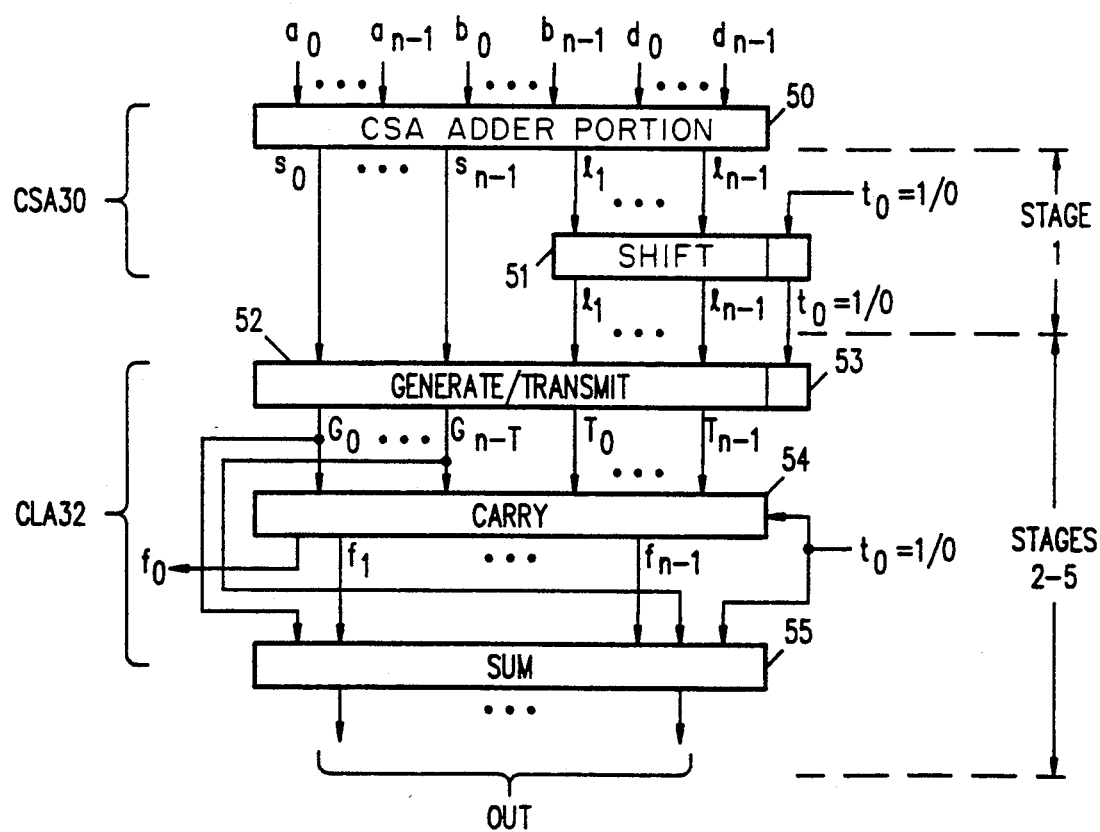
FIG. 4 is a schematic showing the production of intermediate terms in a multi-stage representation of the ALU illustrated in FIG. 3.

In the invention, the carries $c_0$ and $c_1$ of equation (1) are derived implicitly from values input into and generated within the three-to-one ALU of FIG. 3. The signals of interest to the implicit determination of these carries are illustrated in FIG. 4, where the 3-1 ALU of FIG. 3 is illustrated as a five-stage mechanism in which the CSA 30 occupies stage one, and the CLA 32 stages two through five. The three operands are input to the adder portion 50 of the CSA 30, which generates the sum and carry outputs. The carry output is shifted at 51 and the "hot" one position in the carry output is filled by the current value of $t_0$. The sum and carry are forwarded from stage one to stage two which is occupied by generate/transmit circuitry 53 producing conventional generate (Gi) and transmit ($T_i$) terms in response to the sum and carry produced by the CSA 30. In the CLA 32, conventional carries are generated in a carry circuit 54 in response to the generate and transmit terms and to the $t_1$ input. The generate and carry terms are fed, together with $t_1$, to a summing circuit 55 at stage five of the arithmetic unit. The summing circuit conventionally combines its inputs to produce the result (OUT).

When used herein, the term "stage" denotes a level in a logic circuit which corresponds to a basic unit of logic fabrication. Such units are called "booksets". Conventionally, a bookset represents one unit of delay through a logic circuit which may include a plurality of such units in series. In this application, the term "stage" does not correspond to a clocked unit of a pipelined sequence.

The invention lies in the realization that overflow for the second instruction alone can be detected in the data dependency collapsing arithmetic unit at the same stage that the result of the three-to-one addition is generated. This is accomplished in the invention by using only the values input into, and generated within, the data dependency collapsing arithmetic unit. These signals can be understood with reference to FIG. 4 and to the development which follows.

Using the development in appendix 1, an algorithm is derived for this invention which allows the implicit determination of carries $c_0$ and $c_1$ of equation (1).

In the algorithm, $c_0$ and $c_1$ are given by:

$$c_0 = k_0 V l_0 V f_0$$

$$c_1 = k_1 V l_1 V f_1$$

Let $G_i$ and $T_i$ represent the generate and transmit signals of a two-to-one addition. Understanding that adjacency of terms denotes the "AND" operation and that "+" denotes the OR operation, these signals can be derived from the inputs to the arithmetic unit illustrated in FIGS. 3 and 4 by:

$$G_i = a_i d_i$$

$$T_i = a_i + d_i$$

Let $x_{i+1}$ represent the carry into bit position i from bit position i+1. The carry from bit position 0, $x_0$, can be found from the carry from bit position 1, $x_1$ by:

$$x_0 = (G_0 + T_0 x_1)$$

using this expression for $x_0$, $$x_0 V x_1 = (G_0 + T_0 x_1) V x_1$$

$$x_0 V x_1 = (\overline{G_0 T_0} + \overline{G_0 x_1}) x_1 + (G_0 + T_0 x_1) \overline{x_1}$$

however, $$\overline{T_0} = \overline{(a_0 + d_0)}$$

$$\overline{T_0} = \overline{a_0} \overline{d_0} + \overline{a_0} \overline{d_0}$$

$$\overline{T_0} = \overline{a_0} a_0 \overline{d_0} + \overline{d_0} a_0 \overline{d_0}$$

$$\overline{T_0} = (\overline{a_0} + \overline{d_0}) a_0 \overline{d_0}$$

$$\overline{T_0} = \overline{(a_0 d_0)} a_0 \overline{d_0}$$

$$\overline{T_0} = \overline{(a_0 d_0)}\overline{(a_0 + d_0)}$$
$$\overline{T_0} = \overline{G_0 T_0}$$

therefore, $$x_0 V x_1 = \overline{T_0} x_1 + G_0 \overline{x_1}$$

by substituting the expressions for $c_0$ and $c_1$ into the expression for $c_0 V c_1$:

$$c_0 V c_1 = k_0 V l_0 V f_0 V k_1 V l_1 V f_1; \text{ or,}$$

$$c_0 V c_1 = k_0 V k_1 V l_0 V f_0 V f_1 V l_1$$

However, $k_0 V k_1$ is an exclusive-OR of carries from the two-to-one addition resulting from execution of the first instruction alone. Making use of the expression developed above for $x_0 V x_1$, $k_0 V k_1$ can be written as:

$$k_0 V k_1 = \overline{a_0} \overline{d_0} k_1 + a_0 d_0 \overline{k_1}$$

$$k_0 V k_1 = \overline{a_0} \overline{d_0} k_1 V a_0 d_0 \overline{k_1}$$

furthermore, $l_0$ can be expressed as:

$$l_0 = a_0 d_0 + a_0 b_0 + b_0 d_0$$

$$l_0 = a_0 d_0 V ((a_0 b_0 + b_0 d_0) \overline{a_0 d_0})$$

The last term of this expression can be reduced to:

$$(a_0 b_0 + b_0 d_0)\overline{a_0 d_0} = (a_0 b_0 + b_0 d_0)(\overline{a_0} + \overline{d_0})$$

$$(a_0 b_0 + b_0 d_0)\overline{a_0 d_0} = \overline{a_0} b_0 d_0 + a_0 b_0 \overline{d_0}$$

$$(a_0 b_0 + b_0 d_0)\overline{a_0 d_0} = b_0(a_0 V d_0)$$

Substituting this expression into that for $l_0$ produces:

$$l_0 = a_0 d_0 V (b_0(a_0 V d_0))$$

from which, $$k_0 V k_1 V l_0 = a_0 d_0 \overline{k_1} V \overline{a_0} \overline{d_0} k_1 V a_0 d_0 V (b_0(a_0 V d_0))$$

$$k_0 V k_1 V l_0 = a_0 d_0 k_1 V \overline{a_0} \overline{d_0} k_1 V (b_0(a_0 V d_0))$$

However, since:

$$a_0 d_0 k_1 V \overline{a_0} \overline{d_0} k_1 = (a_0 + d_0 + \overline{k_1}) \overline{a_0} \overline{d_0} k_1 + a_0 d_0 k_1 (\overline{a_0} + \overline{d_0} + \overline{k_1})$$

$$a_0 d_0 k_1 V \overline{a_0} \overline{d_0} k_1 = \overline{a_0} \overline{d_0} k_1 + a_0 d_0 k_1$$

$$a_0 d_0 k_1 V \overline{a_0} \overline{d_0} k_1 = \overline{(a_0 V d_0)} k_1$$

$k_0 V k_1 V l_0$ can be expressed as:

$$k_0 V k_1 V l_0 = \overline{(a_0 V d_0)} k_1 V (b_0(a_0 V d_0))$$

$$k_0 V k_1 V l_0 = \overline{(a_0 V d_0)} k_1 + b_0(a_0 V d_0)$$

Similarly, $f_0 V f_1$ can be expressed as:

$$f_0 V f_1 = s_0 l_1 \overline{f_1} V \overline{s_0} \overline{l_1} f_1$$

Therefore:

$$f_0 V f_1 V l_1 = s_0 l_1 \overline{f_1} V \overline{s_0} \overline{l_1} f_1 V l_1$$

which reduces to:

$$f_0 V f_1 V l_1 = l_1 \overline{s_0} V (f_1 \overline{(s_0 V l_1)})$$

The expressions for $f_0 V f_1 V l_1$ and $k_0 V k_1 V l_0$ that have been derived above can be combined to generate an expression for overflow detection. The results of this combination are given in equation (2):

$$c_0 V c_1 = \overline{(a_0 V d_0)} k_1 V (b_0(a_0 V d)) V l_1 \overline{s_0} V (f_1 \overline{(s_0 V l_1)})) \quad (2)$$

In equation (2) the terms $\overline{(a_0 V d_0)} k_1 V (b_0(a_0 V d_0)) V l_1 \overline{s_0}$ can be generated in four stages; the term $f_1 \overline{(s_0 V l_1)}$ can also be generated in four stages. The overflow signal can then be generated in the fifth stage, the stage that the sum is generated, by using a two-to-one exclusive-OR gate.

Figure 5:
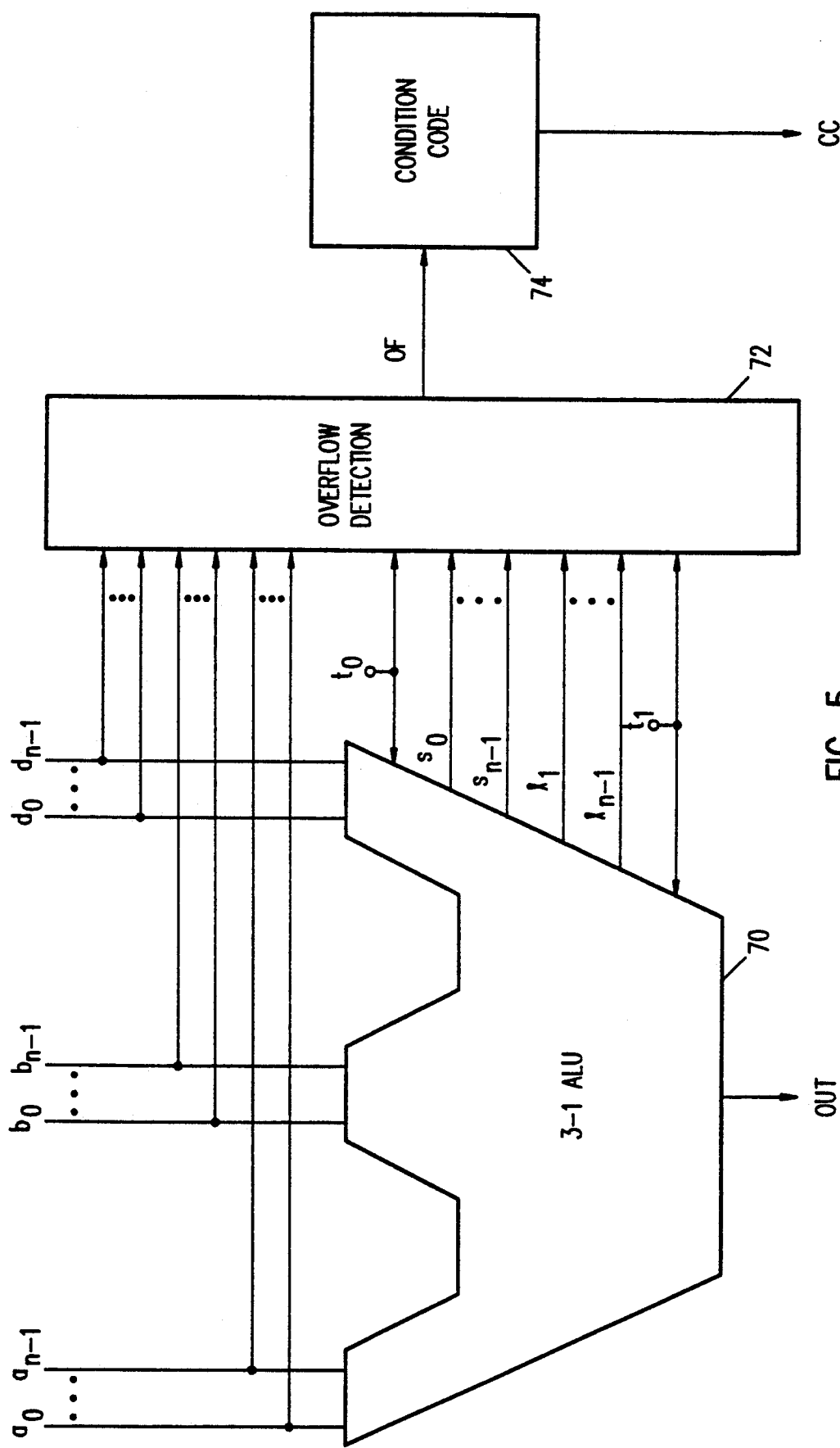
FIG. 5 is a block diagram illustrating the operational interconnection between an overflow detector according to the invention and a three-to-one ALU constructed as illustrated in FIGS. 3 and 4.

Returning once again to the figures, FIG. 5 illustrates the overflow detector of the invention in combination with the 3-1 ALU illustrated in FIGS. 3 and 4. In FIG. 5, the 3-1 ALU is indicated by reference number 70. The overflow detector 72 of the invention is connected to receive the necessary bits of the three operands which are provided for the operation of the ALU 70, the carry-ins to the ALU 70 ($t_0$ and $t_1$), and the sum and carry bits, $s_i$ and $l_i$, generated in the CSA section of the ALU 70. The overflow detector 72 combines these bits according to equations (1) and (2) given above to produce an overflow signal OF. It is contemplated that the overflow signal OF is to be provided to a condition code circuit 74 which will use overflow, together with other signals representing zero results and relational determinations to produce a condition code signal CC.

Figure 6:
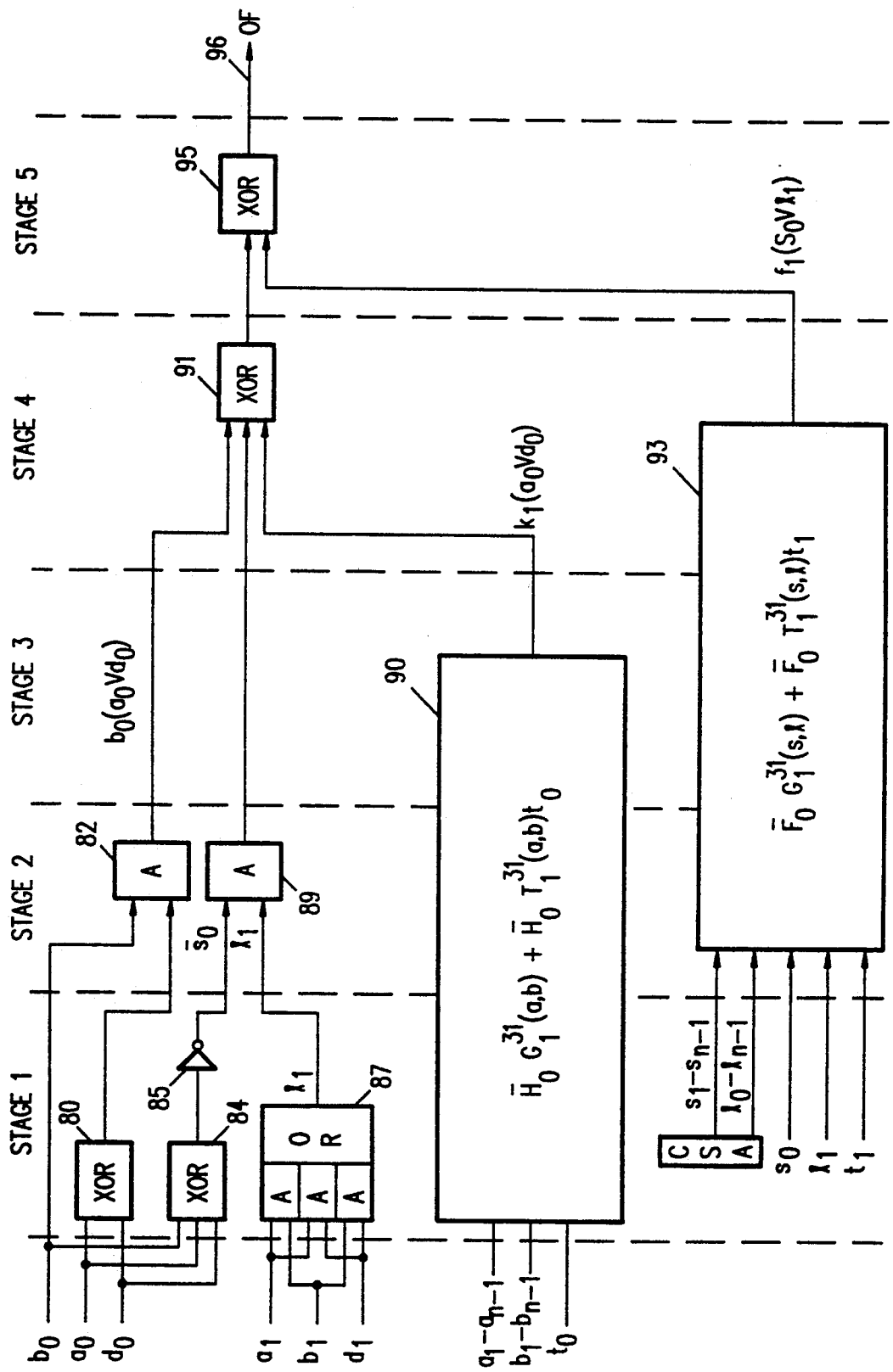
FIG. 6 is a logic diagram illustrating the overflow detector illustrated in FIG. 5.

FIG. 6 illustrates the overflow detector 72 in greater detail. Those skilled in the art will appreciate that the overflow detector is a logic circuit which is definitively described by equations (1) and (2).

As FIG. 6 shows, the overflow detector is a multi-stage apparatus having five stages, the same number of stages as the arithmetic unit illustrated in FIGS. 3 and 4. The overflow signal OF is output by the fifth stage of the overflow detector, which is the same stage at which the output of the arithmetic unit is generated. Therefore, the overflow detector makes the overflow results available substantially simultaneously with the result produced by the data dependency collapsing arithmetic unit.

In FIG. 6, the overflow detector generates the overflow signal in response only to signals which are either input into, or developed within, the 3-1 ALU. Thus, the inputs to stage 1 of the overflow detector consist of the operands a, b, and d, together with the carry-in $t_0$ supplied to the arithmetic unit to properly execute its function. At stage 1 of the overflow detector, the sum and carry output by the CSA arithmetic unit 34 in FIG. 3 are input into the overflow detector, together with the carry-in $t_1$ necessary to properly execute the function of the ALU.

In FIG. 6, the elements of the expression given above for $c_0Vc_1$ are all developed by circuit elements well-known to the reasonably skilled digital engineer. In this regard, the XOR gate 80 and the AND gate 82 operate on $a_0$, $b_0$ and $d_0$ to produce the second term of equation (2), that is, $b_0(a_0Vd_0)$. The XOR gate 84 and inverter 85 produce $\bar{s}_0$, while the three-AND, single-OR circuit 87 operates on $a_1$, $b_1$, and $d_1$ to produce $l_1$. The AND gate 89 combines the outputs of circuit elements 85 and 87 to produce the third term of equation (2), that is, $l_1\bar{s}_0$.

The first term of equation (2) is produced by element 90. In FIG. 6, the element 90 has been illustrated in a level of abstraction to express the computation of $k_1(a_0Vd_0)$, which is the first term of equation (2). For the carry term, $k_1$, the following holds:

$$k_1 = G_1^{31}(a,d) + T_1^{31}(a,d)t_0$$

The calculations of the complex generate and transmit terms, $G_1^{31}$ and $T_1^{31}$, are well-known in the art, and reference is given in particular to FIGS. 8 and 9 of U.S. Pat. No. 4,924,424, assigned to the assignee of this application, for generation of these complex values. The distributed term $\bar{H}_0$ denotes $\bar{H}_0 = \overline{(a_0Vd_0)}$.

Figure 7A:
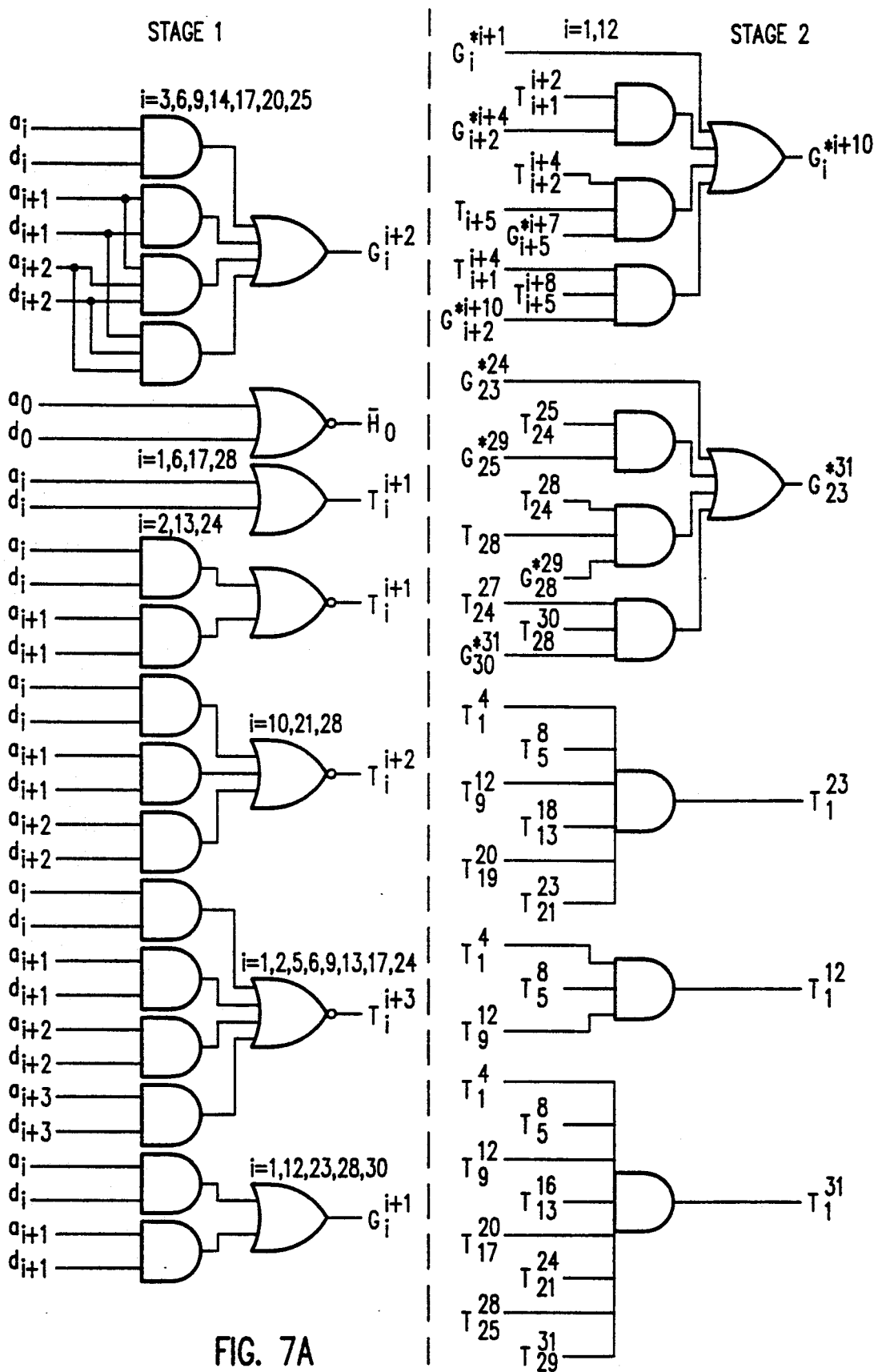
FIGS. 7A and 7B form a schematic logic diagram illustrating in greater detail a generation block of FIG. 6.
Figure 7B:
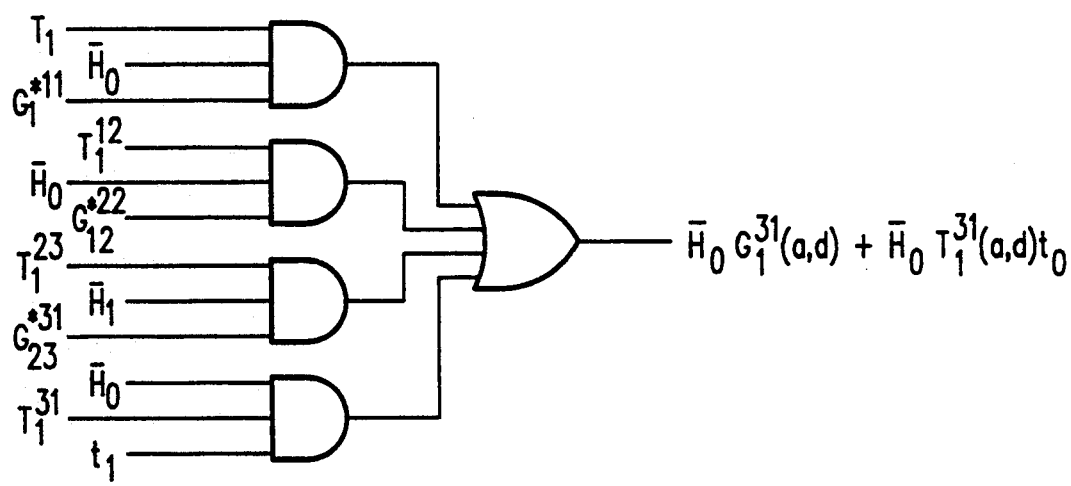

As FIGS. 7A and 7B show, the output of the circuit element 90 requires three stages for generation, the output being available at the inputs to stage 4. In particular, in FIG. 7, the term $\bar{H}_0$ is produced at the inverted output of an exclusive-OR gate 100, while the complex generate and transmit terms are produced by the illustrated circuits Although FIGS. 5, 6, and 7 illustrate generation of complex transmit and carry terms by circuitry which is separate from the 3-1 ALU, it is contemplated that these terms can also be obtained from the CLA of the ALU.

Returning to FIG. 6, the three equation terms produced by circuit elements 82, 89, and 90 are combined in the three-to-one exclusive OR circuit 91 in stage four of the detector. Finally, the last term of equation (2) is generated by circuit element 93 whose inputs receive the stage one ALU outputs from the CSA of the arithmetic unit, the output of the exclusive-OR gate 84 ($s_0$), the output of the AND/OR element 87 ($l_1$) and the carry in $t_1$. The element 93 combines these terms according to the following equation:

$$f_1(\overline{s_0Vl_1}) = \bar{F}_0 G_1^{31}(s,l) + \bar{F}_0 T_1^{31}(s,l)t_1$$

where the expression can be implemented in a three-stage circuit identical with the circuit of FIG. 7, with the exceptions that the complex generate and transmit terms are generated as functions of the sum and carry terms produced by the CSA 30, the carry-in $t_1$ is provided, and the term $\bar{F}_0$ is determined by $\bar{F}_0 = \overline{(s_0Vl_1)}$.

The overflow signal is generated at the output of the exclusive OR gate 95 which receives as inputs the output of the exclusive-OR gate 91 and the circuit 93.

APPENDIX I

Theorem 1: If $S = AVB$ and $S = AVC$, then $B = C$.

The proof of this theorem is given in this appendix. This proof uses the definitions of formal implication and equality of propositional algebra. These definitions are:

Definition 1—Formal Implication (denoted by $P \rightarrow Q$):

For each possible pair of corresponding values of $P_0, Q_0$ of the propositional functions P and Q, either $P_0$ is false or if $P_0$ is true then $Q_0$ is true also.

Since the algebra of propositions is a Boolean algebra, the above definition can be represented as:

$$(P \rightarrow Q) = \bar{P} + Q.$$

Definition 2—Equality (denoted as $P = Q$):
If $P \rightarrow Q$ and $Q \rightarrow P$; then $P = Q$.
This definition can be expressed as:

$$(P = Q) = (P \rightarrow Q)(Q \rightarrow P)$$

where $(x)(y)$ implies AND. Substituting the expression for formal implication into that for equality gives:

$$(P = Q) = (\bar{P} + Q)(\bar{Q} + P)$$

$$(P = Q) = \bar{P}(\bar{Q} + P) + Q(\bar{Q} + P)$$

$$(P = Q) = \bar{P}\bar{Q} + \bar{P}P + Q\bar{Q} + QP$$

$$(P = Q) = \bar{P}\bar{Q} + QP$$

Theorem 1 can be proved by making use of the last expression for equality. Applying this expression to the first condition of Theorem 1, that is, $S = AVB$ produces:

$$(S = (AVB)) = \bar{S}(\overline{AVB}) + S(AVB).$$

But by the second condition of Theorem 1, $S = AVC$. Substituting AVC for S in the previous equation gives:

$$(S = (AVB)) = (\overline{AVC})(\overline{AVB}) + (AVC)(AVB)$$

$$(S = (AVB)) = (\overline{AC + AC})(\overline{AB + AB}) + (\bar{A}C + A\bar{C})(\bar{A}B + A\bar{B})$$

$$(S = (AVB)) = ((\overline{\bar{A}C})(\overline{A\bar{C}}))((\overline{\bar{A}B})(\overline{A\bar{B}})) + \bar{A}C(\bar{A}B + A\bar{B}) + A\bar{C}(\bar{A}B + A\bar{B})$$

$$(S = (AVB)) = (A + \bar{C})(\bar{A} + C)(A + \bar{B})(\bar{A} + B) + \bar{A}CB + \bar{A}CA\bar{B} + A\bar{C}\bar{A}B + A\bar{C}B$$

$$(S = (AVB)) = (A(\bar{A} + C) + \bar{C}(\bar{A} + C))(A(\bar{A} + B) + B(\bar{A} + B)) + \bar{A}CB + A\bar{C}\bar{B}$$

$$(S = (AVB)) = (A\bar{A} + AC + \bar{C}\bar{A} + \bar{C}C)(A\bar{A} + AB + B\bar{A} + BB) + \bar{A}CB + A\bar{C}\bar{B}$$

$$(S = (AVB)) = (AC + \bar{C}\bar{A})(AB + \bar{B}\bar{A}) + \bar{A}CB + A\bar{C}\bar{B}$$

$$(S = (AVB)) = (AC(AB + \bar{B}\bar{A}) + \bar{C}\bar{A}(AB + \bar{B}\bar{A})) + \bar{A}CB + A\bar{C}\bar{B}$$

$$(S = (AVB)) = (ACB + AC\bar{B}\bar{A} + \bar{C}\bar{A}AB + \bar{C}\bar{A}\bar{B}) + \bar{A}CB + A\bar{C}\bar{B}$$

$$(S = (AVB)) = ACB + \bar{C}\bar{A}\bar{B} + \bar{A}CB + A\bar{C}\bar{B}$$

$$(S = (AVB)) = ACB + \bar{A}CB + \bar{A}\bar{C}\bar{B} + A\bar{C}\bar{B}$$

$$(S = (AVB)) = (A + \bar{A})CB + (\bar{A} + A)\bar{C}\bar{B}$$

$$(S = (AVB)) = CB + \bar{C}\bar{B}$$

But, $$(B = C) = \bar{C}\bar{B} + CB$$

therefore,

B=C

Theorem 2:

The carry at bit position i+1 generated by the serial execution of an interlocked pair of arithmetic instructions can be determined by:

$$c_{i+1} = Z_{i+1} V l_{i+1} V f_{i+1}$$

where $l_{i+1}$ and $f_{i+1}$ are the carry generated by the CSA and the carry generated by the CLA during the three-to-one add, respectively, and $\overline{Z_{i+1}}$ represents either $k_{i+1}$ or $k_{i+1}$ where $k_{i+1}$ is the carry generated at the bit position i+1 during the serial execution of the first instruction.

Proof: The sum and carry from the CSA at bit position i can be determined from:

$$s_i = a^*_i V b^*_i V d^*_i$$

and $$l_i = a^*_i b^*_i + a^*_i d^*_i + b^*_i d^*_i$$

where V represents EXCLUSIVE OR, $a^*_i b^*_i$ represents logical AND, and + represents logical OR. The result, S, from the three-to-one ALU is computed by:

$$S_i = s_i V l_{i+1} V f_{i+1}$$

with $$l_{32} = t_0 \text{ and } f_{32} = t_1 = C_{in}$$

where $t_0$ and $t_1$ are the hot one's supplied to the three-to-one operation corresponding to the hot one's supplied to the execution of the first and second instruction, respectively. Note that for any carry, the subscript i represents the carry from bit i into bit i−1, for instance, $f_1$ represents the carry generated at bit position 1 into position 0 by the CLA. Similarly, the results of the serial execution can be expressed as:

$$e_i = a_i V d^+_i V k_{i+1}$$

and $$S^*_i = e^*_i V b^*_i V c_{i+1}$$

with $$k_{32} = h_0 = C_{in} \text{ and } C_{32} = h_1 = C_{in}$$

where $h_0$ and $h_1$ are the hot one's supplied to the serial execution of the first and second instructions, respectively.

As has been shown, six unique cases arise due to the combination of add/substract instructions and possible interlocks. These cases were given in tables 1 and 2. Each of these cases must be considered to complete the proof.

Cases 1,2,3, and 4

The following identities hold for these cases:

$a^*_i = a_i$ because for serial and parallel execution, a is always positive, $d^*_i = d^+_i$ because when d is positive (negative) for serial execution it is also positive (negative) for parallel execution, $b^*_i = b^+_i$ because when b is positive (negative) for serial execution, denoted by $b^+_i$, it is also positive (negative) for parallel execution, $e^*_i = e_i$ because the positive result of the first instruction is required for the serial execution of the pair.

With these identities, the expression for $S^*_i$ for 023 i≦31 can be written as:

$$\begin{aligned} S^*_i &= e^*_i V b^*_i V c_{i+1} \\ &= e_i V b^*_i V c_{i+1} \\ &= a_i V d^+_i V k_{i+1} V b^*_i V c_{i+1} \\ &= a^*_i V d^*_i V b^*_i V k_{i+1} V c_{i+1} \\ &= s_i V k_{i+1} V c_{i+1} \end{aligned}$$

Since, $$xV0 = x \text{ and } xVx = 0,$$

the sum from the three-to-one addition can be expressed as:

$$\begin{aligned} S_i &= s_i V l_{i+1} V f_{i+1} V k_{i+1} V k_{i+1} \\ &= s_i V k_{i+1} V k_{i+1} V l_{i+1} V f_{i+1} \end{aligned}$$

where $0 \leq i \leq 31$. But the results from the execution of the instruction pair are equivalent for each implementation. Therefore, $$S_i = S^*_i$$

so that by Theorem 1, $$c_{i+1} = k_{i+1} V l_{i+1} V f_{i+1}.$$

Cases 5 and 6

For cases 5 and 6:

$a^*_i = \bar{a}_i$ because for serial execution, a is always positive while for parallel execution, a is always negative, $d^*_i = \bar{d}^+_i$ because when d is positive (negative) for the serial execution, it is negative (positive) for the parallel execution, $b^*_i = b^+_i = b_i$ because for serial and parallel execution, b is always positive, $e^*_i = \bar{e}_i$ because the negative of the result of the serial execution of the first instruction is required for the execution of the second instruction.

Using these identities in the expressions for $S^*_i$ when $0 \leq i \leq 31$ gives:

$$\begin{aligned} S^*_i &= e^*_i V b^*_i V c_{i+1} \\ &= \bar{e}_i V b^*_i V c_{i+1} \\ &= \overline{a_i V d^+_i V k_{i+1}} V b^*_i V c_{i+1} \\ &= a_i V d^+_i V k_{i+1} V b^*_i V c_{i+1} \\ &= a^*_i V d^*_i V k_{i+1} V b^*_i V c_{i+1} \\ &= a^*_i V d^*_i V b^*_i V k_{i+1} V c_{i+1} \\ &= a^*_i V d^*_i V b^*_i V k_{i+1} V c_{i+1} \\ &= s_i V k_{i+1} V c_{i+1}. \end{aligned}$$

But as for cases 1 through 4, $S_i$ can be expressed as:

$$S_i = s_i \vee k_{i+1} \overline{\vee k_{i+1}} \vee l_{i+1} \vee f_{i+1}$$

were $0 \leq i \leq 31$, and since $$S_i = S^*_i,$$

then $$c_{i+1} = k_{i+1} \vee l_{i+1} \vee f_{i+1}$$

follows from Theorem 1.
QED.

Theorem 3: The carries, $k_{i+1}$ and $\overline{k_{i+1}}$, required to generate $c_{i+1}$ can be generated by:

$$Z_{i+1} = G_{i+1}{}^{31} + T_{i+1}{}^{31} C_{in},$$

$T_{i+1}{}^{31}$, and $G_{i+1}{}^{31}$ being the transmit and generate signals for the addition of a*,d* and $t_0 = C_{in}$ Proof: Assuming the carry equations described in the article by S. Vassiliadis entitled "Recursive Equations for Hardwired Binary Adders" in INT. J. ELECTRONICS, vol. 67, No. 2, pp. 201–213, 1989, and recognizing that:

$$G_{i+1}{}^{31} = T_{i+1} G^*_{i+1}{}^{31},$$

it must be proven that $$Z_{i+1} = T_{i+1} G^*_{i+1}{}^{31} + T_{i+1}{}^{31} t_0$$

where $T_i$ and $G^*_i$ are the transmit and pseudo-generate signals, respectively, at bit position i and $T_i{}^n$ and $G^*_i{}^n$ are the transmit and pseudo-generate signals, respectively, from bit position n to bit position i for the serial execution of the first instruction. Let $T^+_i$, $G^+_i$, $T^+_i{}^n$, and $G^+_i{}^n$ be the corresponding signals when using the operands a* and d* applied to the three-to-one adder. Then, $$T_i = a_i + d^+_i$$

$$G^*_i = a_i d^+_i$$

$$T_i{}^n = (a_i + d^+_i)(a_{i+1} + d^+_{i+1}) \ldots (a_n + d^+_n)$$

$$G^*_i{}^n = a_i d^+_i + a_{i+1} d^+_{i+1} + T_{i+1} a_{i+2} d^+_{i+2} + \ldots + T_{i+1}{}^{n-1} a_n d^+_n$$

$$T^+_i = a^*_i + d^*_i$$

$$G^+_i = a^*_i d^*_i$$

$$T^+_i{}^n = (a^*_i + d^*_i)(a^*_{i+1} + d^*_{i+1}) \ldots (a^*_n + d^*_n)$$

$$G^+_i{}^n = a^*_i d^*_i + a^*_{i+1} d^*_{i+1} + T^+_{i+1} a^*_{i+2} d^*_{i+2} + \ldots + T^+_{i+2}{}^{n-1} a^*_n d^*_n$$

The carry generated at bit position i+1 during the serial execution of the first instruction, $k_{i+1}$, can be expressed as:

$$k_{i+1} = T_{i+1}(G^*_{i+1}{}^{31} + T_{i+2}{}^{31} h_0),$$

while the carry generated within the three-to-one adder 1, using the operands a* and d*, $Z_{i+1}$, can be expressed as:

$$Z_{i+1} = T^+_{i+1}(G^+_{i+1}{}^{31} + T^+_{i+2}{}^{31} t_0).$$

Each of the six unique cases shown in tables 1 and 2 must be considered to complete the proof.

Cases 1, 2, 3, and 4
Given that:

$$a^*_i = a_i$$

$$d^*_i = d^+_i$$

shown previously, and that $$t_0 = h_0$$

shown in tables 1 and 2, then $$T_i^+ = (a^*_i + d^*_i)$$
$$= (a_i + d_i^+)$$
$$= T_{i+1} \text{ and}$$

$$G_i^+ = a^*_i d^*_i$$
$$= a_i + d_i^+$$
$$= G^*_i.$$

Thus, $$T^+_i{}^n = T_i{}^n$$

and $$G^+_i{}^n = G^*_i{}^n.$$

Substituting these expressions into that for $Z_{i+1}$ gives:

$$Z_{i+1} = T_{i+1}(G^*_{i+1}{}^{31} + T_{i+2}{}^{31} t_0).$$

Since $$t_0 = h_0,$$

$Z_{i+1}$ becomes:

$$Z_{i+1} = T_{i+1}(G^{*31}_{i+1} + T^{31}_{i+2} h_0)$$
$$= k_{i+1}.$$

Therefore, $Z_{i+1}$ generates $k_{i+1}$ as is required by Theorem 2 for generating $c_{i+1}$ for these cases.

Cases 5 and 6
Given that:

$$a^*_i = \overline{a_i}$$

$$d^*_i = \overline{d^+_i}$$

shown previously, and $$t_0 = \overline{h_0}$$

shown in tables 1 and 2, then $$T_i = \overline{(a^*_i + d^*_i)}$$
$$= \overline{(\overline{a_i} + \overline{d_i}^+)}$$
$$= \overline{\overline{a_i d_i^+}}$$
$$= \overline{G^*_i} \text{ and}$$
$$G^*_i = a^*_i d^*_i$$
$$= \overline{a_i d_i^+}$$
$$= \overline{\overline{a_i + d^+_i}}$$
$$= \overline{T_i}$$

Substituting these expressions as well as the expression for $t_0$ into that for $Z_{i+1}$ gives:

$$Z_{i+1} = \overline{G^*_{i+1}(T_{i+1}} + \overline{T_{i+2}} + \overline{G^*_{i+2}T_{i+3}} + \overline{G^*_{i+2}G^*_{i+3}T_{i+4}} + \ldots + \overline{G^*_{i+2}G^*_{i+3} \ldots G^*_{30}T_{31}} + \overline{G^*_{i+2}G^*_{i+3} \ldots G^*_{31}h_0}).$$

This can be reduced by repeated application of DeMorgan's Theorem to:

$$Z_{i+1} = \overline{G^*_{i+1}} + \overline{T_{i+1}T_{i+2}G^*_{i+2}} + \overline{T_{i+1}T_{i+2}T_{i+3}G^*_{i+3}} + \overline{T_{i+1}T^{29}_{i+2}T_{30}G^*_{30}} + \overline{T_{i+1}T^{31}_{i+2}} + \overline{G^*_{i+1}} + \overline{G^*_{i+2}} + \ldots + \overline{G^*_{31}} + \overline{h_0}.$$

But
$T_i G_i = G_i$
therefore,
$$Z_{i+1} = \overline{T_{i+1}G^*_{i+1}} + \overline{T_{i+1}G^*_{i+2}} + \overline{T_{i+1}T_{i+2}G^*_{i+3}} + \ldots + \overline{T_{i+1}T^{29}_{i+2}G^*_{30}} + \overline{T_{i+1}T^{31}_{i+2}} + \overline{G^*_{i+1}} + \overline{G^*_{31}} + \overline{h_0}$$

which reduces to:

$$Z_{i+1} = \overline{T_{i+1}(G^{31}_{i+1} + T^{31}_{i+2}h_0)}$$
$$= \overline{k_{i+1}}$$

Therefore, for these cases, $Z_{i+1}$ produces $\overline{k_{i+1}}$ which is the value that is required for generating $c_{i+1}$.

QED.

The previous proof made use of the recursive equations based on the new carry as described in the article by S. Vassiliadis. The equivalence of the results for the new carry and carry equations are discussed in that reference. Therefore, the carry, $k_{i+1}$ or $\overline{k_{i+1}}$ required for generating $c_{i+1}$ can be calculated from either: ;

$$Z_{i+1} = G_{i+1}{}^{31} + T_{i+1}{}^{31}t_0$$

or $$Z_{i+1} = T_{i+1}G_{i+1}{}^{31} + T_{i+1}{}^{31}t_0$$

Theorems 2 and 3 suggest that the carries at position i+1 of the second instruction in the parallel execution of two interlocked arithmetic instructions can be generated in two ways. First, the computation can use the carries at position i+1 of a two-to-one ALU, which is required to produce the result of the first instruction, with the proper inversion, along with $l_{i+1}$ and $f_{i+1}$ which are produced in the three-to-one ALU during the parallel execution of the two instructions (theorem 2). Alternatively, the carry at position i+1 of the second operation can be generated from the three-to-one ALU from its inputs a* and d* with the proper setting of the hot one, $t_0$, and $l_{i+1}$ and $f_{i+1}$ (theorem 3). The carries of the second instruction into and from the MSB can be used to determine the ALU status.

TABLE 1

Functions Arising from Interlocks on First Operand of Second Instruction

| OPERA-TIONS | ALU Function | Case | Hot One's |||| 
|---|---|---|---|---|---|---|
| | | | $t_1$ | $t_0$ | $h_1$ | $h_0$ |
| + + | (a + d) + b = a + b + d | Case 1 | 0 | 0 | 0 | 0 |
| + − | (a + d) − b = a − b + d | Case 2 | 1 | 0 | 1 | 0 |
| − + | (a − d) + b = a + b − d | Case 3 | 0 | 1 | 0 | 1 |
| − − | (a − d) − b = a − b − d | Case 4 | 1 | 1 | 1 | 1 |

TABLE 2

Functions Arising from Interlocks on Second Operand of Second Instruction

| OPERA-TIONS | ALU Function | Case | Hot One's ||||
|---|---|---|---|---|---|---|
| | | | $t_1$ | $t_0$ | $h_1$ | $h_0$ |
| + + | b + (a + d) = a + b + d | Case 1 | 0 | 0 | 0 | 0 |
| + − | b − (a + d) = −a + b − d | Case 5 | 1 | 1 | 1 | 0 |
| − + | b + (a − d) = a + b − d | Case 3 | 0 | 1 | 0 | 1 |
| − − | b − (a − d) = −a + b + d | Case 6 | 1 | 0 | 1 | 1 |

Obviously, many modifications and variations of the invention may be inferred and implemented without departing from the scope and spirit of the description and the appended claims.

We claim:

1. A mechanism for detecting arithmetic overflow in a computer system that compounds two instructions by grouping instructions in a sequence of instructions for simultaneous execution by the computer system, the mechanism comprising:

carry-save addition means for generating multi-bit sum and carry signals in response to three multi-bit, binary operands, wherein said three multi-bit binary operands include operands a, b, and d, each of said operands including n bits, the bits of each operand being in order of significance in which significance is given by i, and $0 \leq i \leq n-1$, and in which $a_0$, $b_0$, and $d_0$ denote the most significant bits, and $a_{31}$, $b_{31}$, and $d_{31}$ the least significant bits of operands a, b, and d;

carry look-ahead addition means connected to said carry-save addition means for generating a result signal in response to said sum and carry signals, said result signal representing a result produced by a sequence of two binary arithmetic add-type operations performed on said operands; and logic means connected to said carry-save addition means for producing an overflow signal, OF, representing an overflow condition resulting from the execution of the second binary arithmetic operation of said two binary arithmetic operations, said logic means providing said overflow signal in response to said operands and said sum and carry signals and, wherein said logic means includes:

first means responsive to $a_0$, $b_0$, and $d_0$ for producing a first output corresponding to a first equation term $b_0(a_0 V d_0)$, where the symbol V denotes the exclusive-OR operation;

second means responsive to first and second most significant bits of operand a, operand b, and operand d for producing a second output corresponding to a second equation term $\overline{s_0}l_1$, $s_0$ representing a most significant bit of said multi-bit sum signal and $l_1$ representing a second most significant bit of said multi-bit carry signal;

third means responsive to said multi-bit operands for producing a third output corresponding to a third equation term $k_1(\overline{a_0 \vee d_0})$, wherein $k_1$ represents a carry into a most significant bit of a result produced by execution of the first binary arithmetic operation of said two binary arithmetic operations;

fourth means responsive to said multi-bit sum and carry signals for producing a fourth output corresponding to a fourth equation term $f_1(\overline{s_0 \vee l_1})$, wherein $f_1$ represents a carry into a most significant bit of a result produced by execution of said second binary arithmetic operation; and exclusive-OR means connected to said first, second, third, and fourth means for producing said overflow signal by exclusive-OR combination of said first, second, third, and fourth outputs.

2. The mechanism of claim 1, said logic means for producing said overflow signal, OF, according to:

$$OF = c_0 \vee c_1$$

wherein, $c_0$ is the carry-out of a sign bit that would occur from execution of said second binary operation, $c_1$ is the carry into the sign bit, and the carry ($c_{i+1}$) at bit position $i+1$ which would be generated by serial execution of said first binary operation followed by said second binary operation is given by:

$$c_{i+1} = k_{i+1} \vee l_{i+1} \vee f_{i+1}.$$

3. A method for overflow determination in a three-operand ALU which simultaneously performs a pair of binary arithmetic operations in response to three multi-bit operands $a_i$, $b_i$, and $d_i$, where $0 \leq i \leq n-1$, $a_0$, $b_0$ and $d_0$ are the most significant operand bits, and $a_{n-1}$, $b_{n-1}$, and $d_{n-1}$ are the least significant operand bits, said pair of binary arithmetic operations representing sequential execution of a first arithmetic instruction and a second arithmetic instruction said three-operand ALU including a carry-save adder portion connected to receive said three-multi-bit operands, said method including the steps of:

first, generating multi-bit sum and carry signals in said carry-save adder, including generating multi-bit sum and carry signals $s_i$ and $l_i$, respectively, in said carry-save adder, where $0 \leq i \leq n-1$, $s_0$ and $l_0$ are the most significant sum and carry bits, and $s_{n-1}$ and $l_{n-1}$ are the least significant sum and carry bits; and second, generating an overflow signal indicative of an overflow condition in response to said multi-bit sum and carry signal and said multi-bit operands, said overflow signal representative of an overflow produced by execution of said second instruction following execution of said first instruction, said second generating step includes:

generating a first equation factor signal $b_0(a_0 \vee d_0)$ in response to said operands;

generating a second equation factor signal $\overline{s_0} l_1$ in response to said operands;

generating a third equation factor signal $k_1(\overline{a_0 \vee d_0})$, where $k_1$, represents a carry into a most significant bit of a result which would be produced by execution of said first arithmetic instruction alone;

generating a fourth equation factor signal f, $f_1(\overline{s_0 \vee l_1})$, where $f_1$, represents a carry into a most significant bit of a result which would be produced by execution of said second arithmetic instruction after said first arithmetic instruction; and generating said overflow signal by an exclusive OR combination of said first, second, third, and fourth equation factor signals.

* * * * *